United States Patent
Khan et al.

(10) Patent No.: US 6,654,422 B1
(45) Date of Patent: Nov. 25, 2003

(54) EFFICIENT AUTOMATIC REPEAT REQUEST METHOD USING VARIABLE LENGTH SEQUENCE NUMBERS

(75) Inventors: Farooq Ullah Khan, Parlin, NJ (US); Douglas N. Knisely, Wheaton, IL (US); Sarath Kumar, Eatontown, NJ (US); Kameswara Rao Medapalli, Ocean, NJ (US); Sanjiv Nanda, Clarksburg, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/312,167

(22) Filed: May 14, 1999

(51) Int. Cl.$^7$ ................................................ H04L 27/00
(52) U.S. Cl. ................... 375/240.27; 375/358; 714/748
(58) Field of Search ................. 375/259, 357, 375/358, 240.27; 714/746, 748, 749

(56) References Cited

U.S. PATENT DOCUMENTS

| | | | |
|---|---|---|---|
| 4,617,657 A | 10/1986 | Drynan et al. | 370/60 |
| 4,841,526 A | 6/1989 | Wilson et al. | 371/32 |
| 6,317,430 B1 * | 11/2001 | Knisely et al. | 370/394 |

OTHER PUBLICATIONS

Brown, G.M. et al., *Computer Communication Review*, "Block Acknowledgement Redesigning the Window Protocol", vol. 19, No. 4, pp. 128–135, Sep. 1, 1989.

* cited by examiner

*Primary Examiner*—Stephen Chin
*Assistant Examiner*—Kevin Kim
(74) *Attorney, Agent, or Firm*—Christopher N. Malvone

(57) ABSTRACT

A variable length sequence number is used to identify data units in a communication channel. The sequence number associated with the most recent data that has been received successfully and the sequence number expected with the next new data message to be received are examined to determine the minimum size sequence number necessary to unambiguously identify to the transmitter incorrectly received data that must be retransmitted in a later message. The receiver provides the transmitter with the sequence number associated with the last successfully received byte of data and the sequence number associated with the next expected byte of data. The receiver communicates this information to the transmitter using a NAK control message. The transmitter then uses the sequence number of the next byte of data to be transmitted and the information received in the control message from the receiver to determine the smallest number of bits necessary to represent the sequence numbers for both data transmissions and the retransmission of data that was not received properly by the receiver.

8 Claims, 3 Drawing Sheets

TRANSMITTER

RECEIVER

TRANSMITTER          RECEIVER

DATA MESSAGE

NAK MESSAGE

EFFICIENT AUTOMATIC REPEAT REQUEST METHOD USING VARIABLE LENGTH SEQUENCE NUMBERS

BACKGROUND OF THE INVENTION

1. Field of the Invention

The present invention relates to communications; more particularly, an efficient automatic repeat request method.

2. Description of the Prior Art

FIG. 1 illustrates transmitter 10 and receiver 20. Data messages are communicated from transmitter 10 to receiver 20, and feedback regarding the reception of the data messages is provided from receiver 20 to transmitter 10. The bytes in the data message are numbered sequentially to identify them uniquely at the transmitter and the receiver. The data messages from transmitter 10 to receiver 20 typically include a header field, a sequence number field, a field for bytes of data and a CRC (cyclic redundant code) field. The header field provides information such as information indicating whether the data message contains new data or a retransmission of data that was corrupted in an earlier transmission. The sequence number field contains a sequence number that identifies the bytes of data contained in the message. For example, the sequence number may identify the sequence number of the first byte of data in the data field. The second through last byte of data in the data field are associated with sequence numbers that begin with the sequence number plus 1 and continuing consecutively until a number is associated with the last data byte. The data field contains the bytes of data being transmitted from the transmitter to the receiver, and the CRC field contains a code used to detect and sometimes correct errors in the data message. When receiver 20 receives the data message, it uses the CRC field to determine whether errors have occurred. If errors have occurred, the receiver uses the sequence number field in a subsequent transmission to identify a sequence number associated with byte or bytes of data that were received incorrectly. The receiver provides feedback to transmitter 10 by sending a ACK (acknowledgment) or NAK (negative acknowledge) message to transmitter 10. The negative acknowledge message typically includes two fields: a header field, and a sequence number and length field. Header field provides information such as information indicating that the NAK message is identifying incorrectly received data bytes, or that the NAK message is providing control information to the transmitter. The sequence number and length field include a sequence number that identifies the first byte of data that was received incorrectly and the length portion identifies the number of bytes following the sequence number that were not received or received with errors. Transmitter 10 uses the sequence number and length in the NAK message to identify bytes of information to be retransmitted in another data message to receiver 20. In a data message containing data that is being retransmitted, the header field will indicate that the data message is a retransmission of prior data that was not received properly by receiver 20. The sequence number of retransmitted bytes will be the same that was used when the data bytes were originally transmitted to receiver 20. Again, the sequence number field contains a sequence number that identifies the bytes of retransmitted data contained in the message; for example, the sequence number of the first byte. The remaining bytes are consecutive.

FIG. 2 illustrates high rate and low rate data message. A high rate data message has a header field, the sequence number field, a data field and a CRC field. It should be noted that sequence number field typically includes three bytes, and in the case of a high data rate transfer, a data field may include as many as 4,000 bytes. From a point of view of efficiency, using 3 bytes for a sequence number with 4,000 bytes of information can be considered an efficient transfer. Conversely, the low rate message is inefficient. In this case, three bytes per sequence number are used to identify only 21 bytes in a data transfer message. As a result, the present scheme for providing sequence numbers used in automatic repeat request schemes are not suitable for transmission protocols that involve variable rate transmissions where messages may include either a large number of bytes or a small number of bytes.

SUMMARY OF THE INVENTION

The present invention solves the aforementioned problem by providing a variable length sequence number. The sequence number associated with the most recent data that has been received successfully and the sequence number expected with the next data message to be received are examined to determine the minimum size sequence number necessary to unambiguously identify incorrectly received data that will be retransmitted in a later message. The receiver periodically provides the transmitter with the sequence number associated with the last successfully received byte of data and the sequence number associated with the next expected byte of data. The receiver communicates this information to the transmitter using a control message. The transmitter then uses the sequence number of the next byte of data to be transmitted and the information received in the control message from the receiver to determine the smallest number of bits necessary to represent the sequence numbers for both data transmissions and the retransmission of data that was not received properly by the receiver.

$$V(S) - V_T(R) < 2^m \qquad (1)$$

Equation 1 specifies the smallest m number of bits that may be used to represent the sequence number for new data being transmitted to a receiver. V(S) represents the sequence number that the transmitter will associate with the next byte of data to be transmitted and $V_T(R)$ represent the sequence number received in the control message that identifies the next byte of data expected to be received at the receiver.

$$V(S) - V_T(N) < 2^n \qquad (2)$$

Equation 2 indicates the smallest value of n that can be used to represent a sequence number used to retransmit data to a receiver. In equation 2, $V_T(N)$ is the sequence number received in the control message from the receiver that identifies the last successfully received byte of data by the receiver.

DETAILED DESCRIPTION OF THE INVENTION

Figure 1:
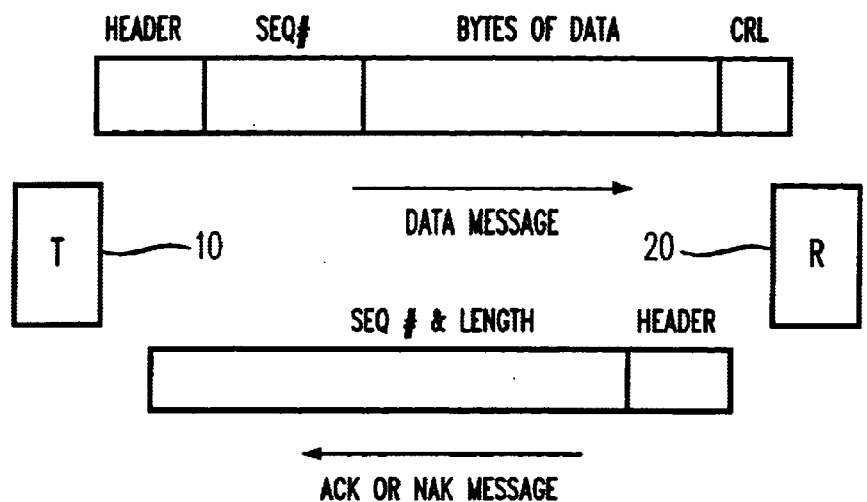
FIG. 1 illustrates an automatic repeat request scheme.
Figure 2:
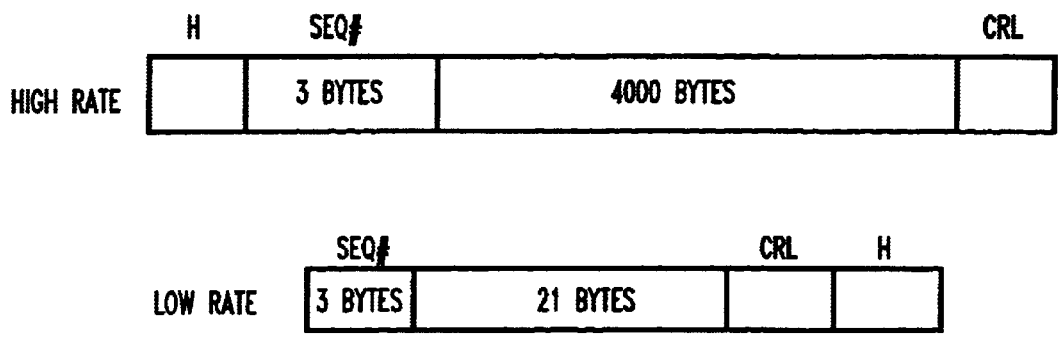
FIG. 2 illustrates a high rate and low rate data message.
Figure 3:
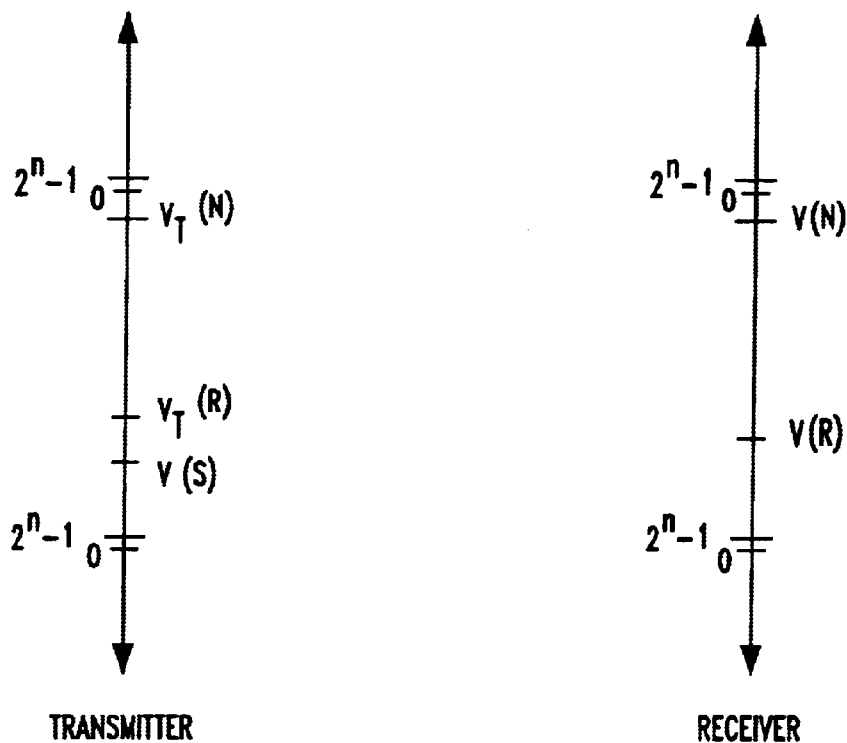
FIG. 3 illustrates a sequence number space as seen at a transmitter and at a receiver.

FIG. 3 illustrates the sequence number space for both the transmitter and receiver. Each vertical line represents the sequence of numbers counting from 0 to $2^k-1$ where k is the maximum number of bits used to represent the sequence number. The vertical lines represent a continuing repeating pattern of sequence numbers where after the number $2^k-1$ the count restarts at zero and continues. This is known as counting modulo $2^k$. On the receiver side, variables V(N) and V(R) are monitored. The variable V(N) represents the largest sequence number such that all the previous bytes of data have been received without errors. The previous bytes received without errors include bytes that were received on first tries without errors and bytes that were received without errors as a result of retransmissions. The variable V(R) represents the sequence number of the next new data byte that is expected to be received from the transmitter. The variable $V_T(N)$, $V_T(R)$ and V(S) are variables maintained at the transmitter. The variable $V_T(N)$ is simply the value of V(N) that was most recently received from the receiver in a control message sent from the receiver to the transmitter. Likewise, the variable $V_T(R)$ is the latest value of the variable V(R) that was transmitted from the receiver to the transmitter in a control message. The variable V(S) is the sequence number that will be assigned to the next byte of data to be transmitted from the transmitter to the receiver.

Figure 4:
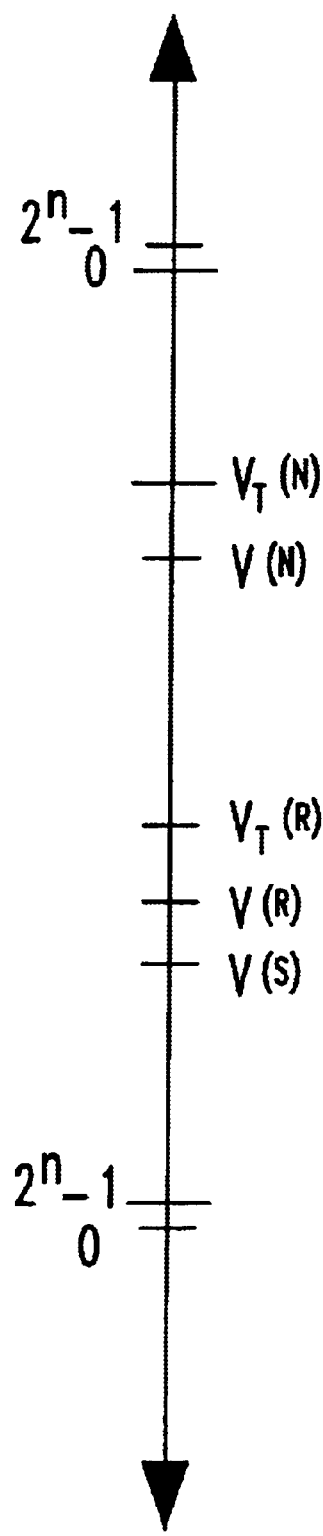
FIG. 4 illustrates the relationship between several control variables and the sequence number space.

FIG. 4 illustrates the relative values of the variables discussed with regard to FIG. 3. Since the counting of sequence numbers is modulo $2^k$, every time the numbers go past $2^k$, a "wrap-around" occurs. For arithmetic operations including the wrap-around, $2^k$ must be added to the number that has wrapped around; e.g., if B has wrapped around following A. Then A<B since A<B+$2^k$. It can be seen that the variable $V_T(N)$ should be less than or equal to the variable V(N) because the variable $V_T(N)$ is the most recent update of the variable V(N) provided to the transmitter by the receiver. As a result, variable V(N) may have increased since the latest update and therefore variable $V_T(N)$ could be less than variable V(N). Similarly, the variable $V_T(R)$ is less than or equal to the variable V(R) because variable $V_T(R)$ is the most recent update of the variable V(R) provided to the transmitter by the receiver. Since the transmitter only receives periodic updates of the variable $V_T(R)$, it is possible that the variable V(R) has increased since the latest update and as a result $V_T(R)$ may be equal to or less than the variable V(R). The variable V(S) is greater than the variable V(R) because of any delays in communications between the transmitter and receiver. As a result, the variable V(R) which is the sequence number next expected by the receiver is less than or at most equal to variable V(S) which is the next sequence number to be assigned to the next byte of data to be transferred from the transmitter to receiver.

Examination of FIG. 4 illustrates that new data transmitted from the transmitter to receiver can be unambiguously identified if the sequence number contains enough bits to specify a sequence number lying between V(S) and $V_T(R)$. Equation 3 illustrates this principle where m specifies the minimum number of bits specified a sequence number lying between V(S) and $V_T(R)$. Note that in this document all addition and subtraction operations on sequence numbers are modulo $2^k$.

$$V(S)-V_T(R)<2^m \qquad (3)$$

When data is received incorrectly, it is retransmitted in a subsequent data message. The retransmitted data is identified by the sequence numbers that were originally used for the transmission. An examination of FIG. 4 illustrates that data to be retransmitted should have a sequence number lying between $V_T(N)$ and V(S). As a result, the number of bits necessary to specify a sequence number that unambiguously identifies retransmitted data is specified by equation 4. In equation 4, n specifies the minimum number of bits required to provide a sequence number that unambiguously identifies retransmitted data.

$$V(S)-V_T(N)<2^n \qquad (4)$$

Figure 5:
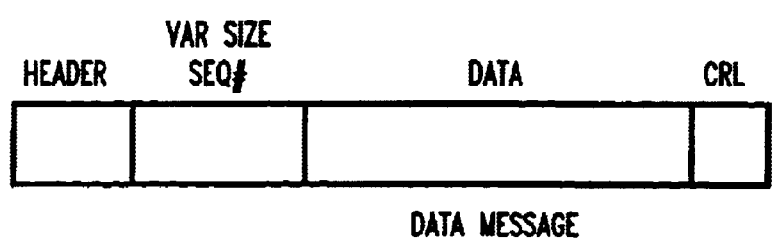
FIG. 5 illustrates a data message and a NAK message having variable size sequence number fields.
Figure 5:
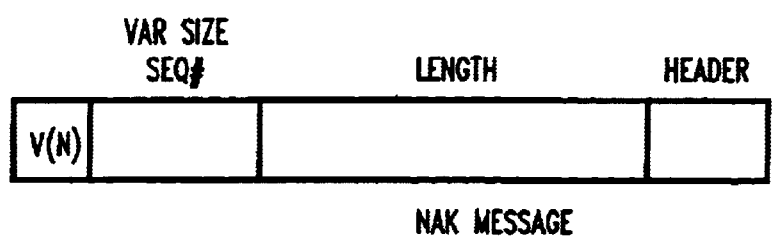

FIG. 5 illustrates the format of a data message which includes a header field, a variable size sequence number field, a data field and a CRC field used for error detection and correction. The header field specifies conditions such as whether the data message is new data or retransmitted data that was not received or was received incorrectly by the receiver. The variable size sequence number in the variable size sequence number field uses at least m bits (for new data) or n bits (for retransmitted data) as specified by equations 3 and 4. The variable size sequence number is the sequence number for the first byte of data in the data field where subsequent bytes of data in the data field are identified by the next consecutive sequence numbers notwithstanding that the sequence numbers identifying the subsequent data bytes are not transmitted in the data message. When the receiver receives the data message with the variable size sequence number, the receiver maps the variable size sequence number to the full sequence number space by adding the variable size sequence number to the current value of the receiver variable V(R). This addition is done using modulo $2^k$ arithmetic so that the next value following $2^k-1$ is zero. With regard to retransmitted data, the header field of the data message indicates that the data is retransmitted data and the variable size sequence number field contains a variable size sequence number having at least n bits specified in equation 4. The sequence number used to identify retransmitted data is mapped into the full sequence number space by simply adding the variable size sequence number to the current value of the receiver variable V(N). If the resultant value is greater than V(R), the receiver must discard the received data.

Variable size sequence numbers may also be used in the NAK messages provided from the receiver to the transmitter. The NAK messages identify data that was received incorrectly or not at all by the receiver. A typical NAK message format is illustrated in FIG. 4 where there is a header field, a variable size sequence field and a length field. It is also possible to include other fields such as a field for CRC information used for error detection and correction. The header field may include information indicating whether the control message is a NAK message identifying data to be retransmitted or whether it is a control message containing control information; e.g., V(N) and V(R). The control message may simply include a header field identifying the message as a control message and indicating whether the message contains the value V(N) or the value V(R). As a result, this provides an explicit way to provide the transmitter with the values $V_T(N)$ and $V_T(R)$. Upon receipt of the value V(N) or V(R), the transmitter sets its variables $V_T(N)$ equal to V(N) and $V_T(R)$ equal to V(R). If the header indicates that the control message is identifying data for retransmission, the variable size sequence number is provided in the variable size sequence number field and a length field indicates the number of bytes being negative acknowledgement beyond the byte identified by the variable size sequence number. It is also possible for the NAK control message to include a V(N) field. In this way, the transmitter can update its value of $V_T(N)$ by setting it equal to V(N) whenever a NAK message identifying data for retransmission is received. As a result, control messages do not have to be the sole method for updating the value $V_T(N)$. It should be noted that if the sum of the variable size sequence number and the length in a NAK control message indicate a value beyond the value $V_T(R)$ presently used by the transmitter, it indicates that the value $V(R)$ presently used by the receiver is also beyond the value $V_T(R)$. As a result, the transmitter then sets its value $V_T(R)$ equal to the sequence number corresponding to the sum of the variable size sequence number and the length specified in the NAK message. Additionally, if the value $V(N)$ specified in the NAK message for the retransmission of data specifies a value greater than the value $V_T(R)$. The transmitter sets its value $V_T(R)$ equal to the value $V(N)$ received in the NAK message.

When the receiver sends the NAK message specifying data for retransmission, the variable size sequence number is chosen based on equation 5.

$$F\_SEQ - V(N) < 2^j \qquad (5)$$

The value F_SEQ is the sequence number of the first byte of data to be specified in the NAK message and the value $V(N)$ is the present value of $V(N)$ being used at the receiver. The difference of these two values is the largest number that is required to unambiguously identify data for retransmission. As a result, j is the minimum number of bits that can be used in the variable size sequence number to unambiguously identify bytes for retransmission. When the transmitter receives a NAK message, it maps the variable size sequence number from the variable size sequence number field to the full sequence number space by simply summing the variable size sequence number and the value $V(N)$ provided in the NAK message. If a value $V(N)$ was not specified in the message, the variable size sequence number is added to the most recent value of $V_T(N)$ to map the number into the fall sequence number space.

Control messages may be used at various time; for example, when the transmitter detects that the variable size sequence number being provided by the transmitter is longer than necessary, the receiver may send a control message to the transmitter to update the variables $V_T(N)$ and $V_T(R)$. Additionally, when there is minimal or no new data to transmit from the transmitter to receiver, the transmitter may transmit a control message to the receiver containing the latest value of $V(S)$. The header field of the control message indicates that an update value for $V(S)$ is contained in the message. The receiver will then use the latest value of $V(S)$ to update the value $V(R)$ by setting the value $V(R)$ equal to the received $V(S)$.

It is also possible to use the concept of variable size sequence numbers where transmissions are made with set block sizes. In this case, a block size contains a fixed number of bytes B. The fixed block size B may be chosen to be the entire data payload field at a specific data rate (e.g., 20 bytes or 4020 bytes). The data message header may be used to indicate whether a fixed block size transmission is being used and to specify the size of the block or the fixed block size may be assumed to be known at the transmitter and receiver; e.g., depending on the specific data rate being used for the transmission. In the case of fixed block size transmissions, equation 6 is used to specify the minimum number of bits used to specify a sequence number for new data.

$$V(S) - V_T(R) < 2^c \cdot B \qquad (6)$$

Equation 6 specifies that c bits is the minimum number of bits used to specify a sequence number that unambiguously identifies a block of data being transmitted. With regard to the retransmission of data, equation 7 specifies that d bits is the minimum number of bits that can be used to specify a sequence number that unambiguously identifies data being retransmitted.

$$V(S) - V_T(N) < 2^d \cdot B \qquad (7)$$

With regard to NAK messages, equation 8 specifies the minimum number of bits f that may be used to identify data that was received incorrectly and should be retransmitted. The value F_SEQ is the sequence number of the first byte of data to be specified in the NAK message.

$$F\_SEQ - V(N) < 2^f \cdot B \qquad (8)$$

Note that a special case exists for wrap-around when using blocks of size B. The following bytes must be identified explicitly through byte sequence numbers, and not through block sequence numbers:

$$LB, 1B+1, \ldots, 2^k-1,$$

where 1 is the largest integer that satisfies $1B < 2^k$.

What is claimed is:

1. A method for identifying data units in a communication channel, comprising the steps of:
   using an identifying space, the identifying space being a set of unique identifying numbers for identifying data units in the communication channel, the identifying space being specified by k bits; and
   associating an identifying number with at least one unit of data to be transmitted, wherein
     the associated identifying number is specified by m bits,
     m is less than k, and
     m is equal to or greater than the number of bits required to represent a difference between an identifying number of a next data unit to be transmitted and an identifying number of a next data unit that is expected to be received by a receiver.

2. The method of claim 1, wherein the identifying number of the next data unit that is expected to be received is communicated from the receiver to a transmitter.

3. The method of claim 1 where m is specified by $V(S)-V_T(R)<2^m$ where $V(S)$ is the identifying number of the next data unit to be transmitted and $V_T(R)$ is the identifying number of a next data unit that is expected to be received, $V_T(R)$ being communicated from the receiver to the transmitter.

4. A method for identifying data units in a communication channel, comprising the steps of:
   using an identifying space, the identifying space being a set of unique identifying numbers for identifying data units in the communication channel, the identifying space being specified by k bits; and
   associating an identifying number with at least one unit of data to be retransmitted to a receiver, wherein
     the associated identifying number is specified by n bits,
     n is less than k, and
     n is equal to or greater than the number of bits required to represent a difference between an identifying number of a next new data unit to be transmitted and an identifying number of a prior correctly received data unit, and
     all received data units having identifying numbers preceding the identifying number of the prior correctly received data unit have been correctly received.

5. The method of claim 4, wherein the identifying number of the prior correctly received data unit received by the receiver is communicated from the receiver to a transmitter.

6. The method of claim 4 where n is specified by $V(S)-V_T(N)<2^n$ where $V(S)$ is the identifying number of the next new data unit to be transmitted and $V_T(N)$ is the identifying number of the prior correctly received data unit received by the receiver, $V_T(N)$ being communicated from the receiver to the transmitter.

7. A method for identifying data units in a communication channel, comprising the steps of:

using an identifying space, the identifying space being a set of unique identifying numbers for identifying data units in the communication channel, the identifying space being specified by k bits; and associating an identifying number with at least one unit of data that was not received correctly in order to request retransmission of the data unit, wherein the associated identifying number is specified by j bits, j is less than k, j is equal to or greater than the number of bits required to represent a difference between an identifying number of a data unit that was not received correctly and an identifying number of a prior correctly received data unit, and all received data units having identify numbers preceding the identifying number of the prior correctly received data unit have been correctly received.

8. The method of claim 7 where j is specified by $F\_SEQ-V(N)<2^j$ where $F\_SEQ$ is the identifying number of the data unit that was not received correctly and $V(N)$ is the identifying number of the prior correctly received data unit.

* * * * *